United States Patent [19]
Hattori et al.

[11] Patent Number: 6,135,643
[45] Date of Patent: Oct. 24, 2000

[54] HUB UNIT BEARING ASSEMBLY AND A METHOD OF MAKING THE SAME

[75] Inventors: Naoshi Hattori; Hisashi Ohtsuki, both of Iwata, Japan

[73] Assignee: NTN Corporation, Osaka, Japan

[21] Appl. No.: 09/121,045

[22] Filed: Jul. 23, 1998

[30] Foreign Application Priority Data

Jul. 28, 1997 [JP] Japan .................................. 9-201096

[51] Int. Cl.[7] ............................ F16C 35/00; F16C 33/58; F16C 33/30
[52] U.S. Cl. ........................ 384/589; 384/585; 384/571; 384/539
[58] Field of Search ...................... 384/571, 560, 384/589, 471, 585, 542, 539, 489, 559, 584, 572, 580, 576; 29/898.061, 989.062, 898.063, 898.064, 989.07

[56] References Cited

U.S. PATENT DOCUMENTS

| | | | |
|---|---|---|---|
| 1,761,490 | 6/1930 | Penner | 384/585 |
| 4,203,635 | 5/1980 | Reiter | 384/571 X |
| 4,425,011 | 1/1984 | Cunningham et al. | 384/571 |
| 4,824,265 | 4/1989 | Hofmann et al. | 384/571 X |
| 4,837,909 | 6/1989 | Schalk | 29/898.061 |
| 4,883,371 | 11/1989 | Matsumoto | 384/584 X |
| 5,037,214 | 8/1991 | Dougherty | 384/584 X |
| 5,136,777 | 8/1992 | Brockmuller et al. | 29/898.063 |
| 5,366,300 | 11/1994 | Deane et al. | 384/585 |
| 5,651,617 | 7/1997 | Danielsson | 384/585 X |
| 5,743,016 | 4/1998 | Manne et al. | 29/898.062 |

FOREIGN PATENT DOCUMENTS 3239811  10/1991  Japan .

Primary Examiner—David A. Bucci
Assistant Examiner—Marcus Charles
Attorney, Agent, or Firm—Birch, Stewart, Kolasch & Birch, LLP

[57] ABSTRACT

A hub unit bearing assembly includes a tapered roller bearing including an inner race (3), an outer race (4) having a fixture (4a) defined therein so as to extend radially outwardly therefrom, and a multiplicity of rollers (5) retained in a circumferential row by a cage (6) and rollingly positioned between the inner race (3) and the outer race (4). A hub (2) including the inner race (3) on a portion of an outer periphery of said hub (2). The inner race (3) is a member either integral with the hub (2) or separated from the hub (2). The cage (6) rotatably accommodates the respective rollers (5) in the form as retained thereby prior to assemblage of the cage (6) with the rollers (5) into the roller bearing. The cage (6) and the rollers (5) are, after the rollers have been mounted in the cage (6), inserted in between the inner race (3) and the outer race (4).

9 Claims, 7 Drawing Sheets

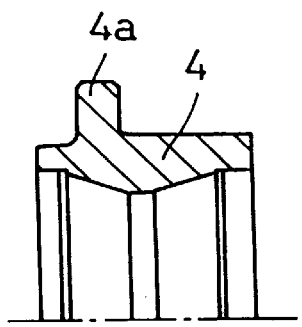
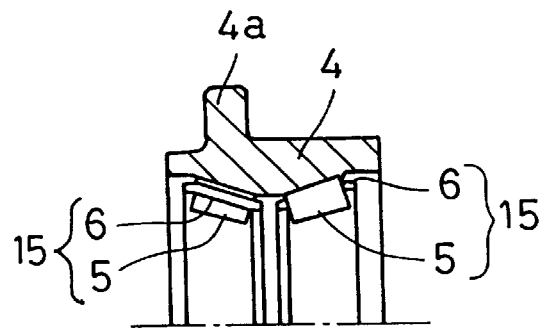
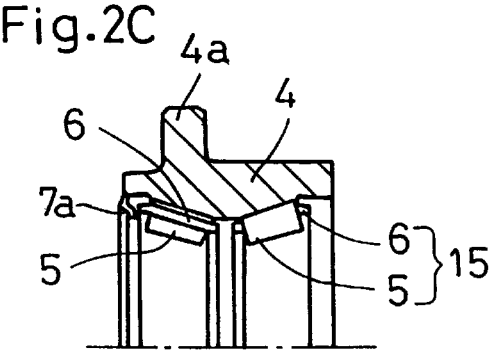
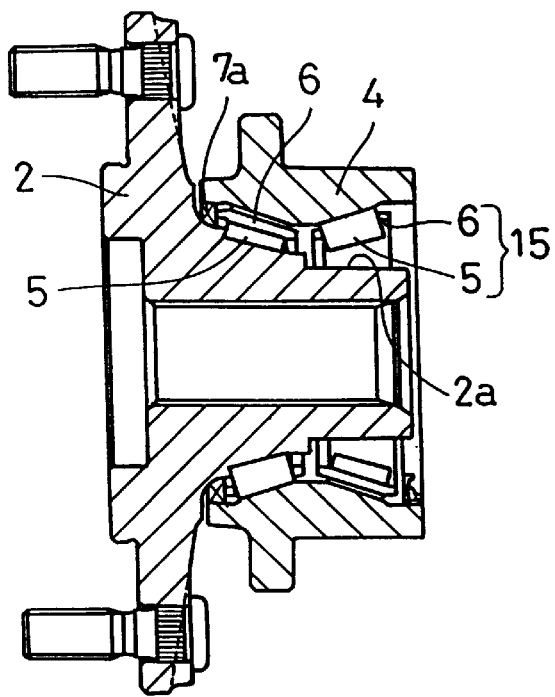
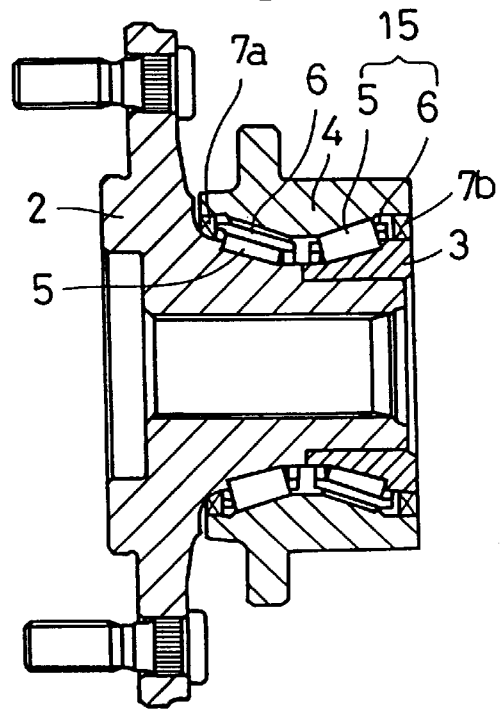

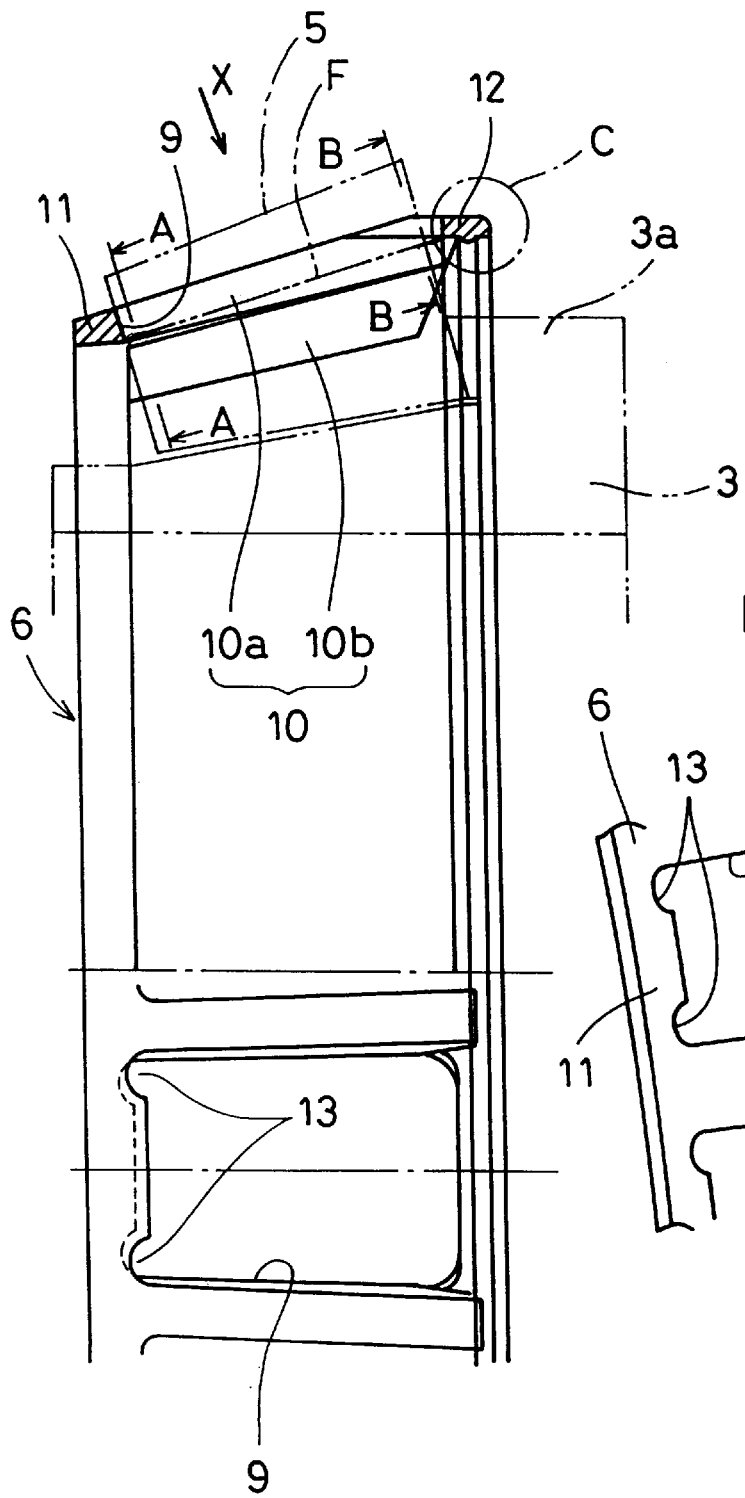
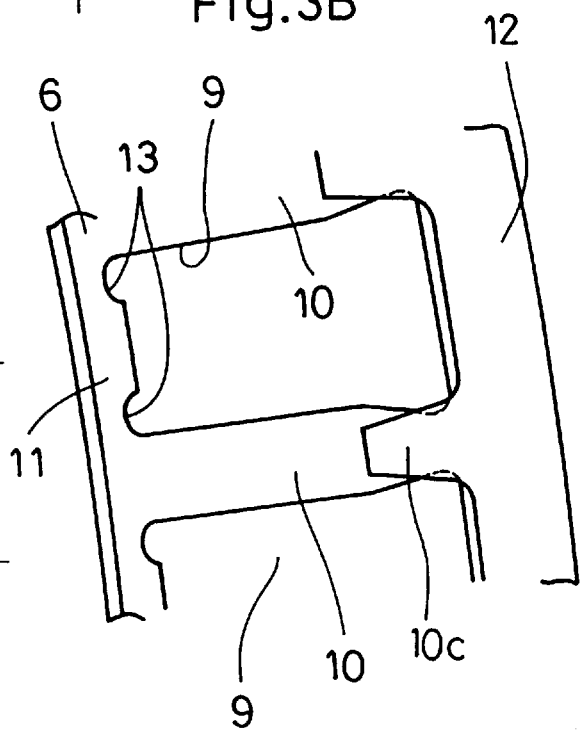
Fig. 3A
Fig. 3B

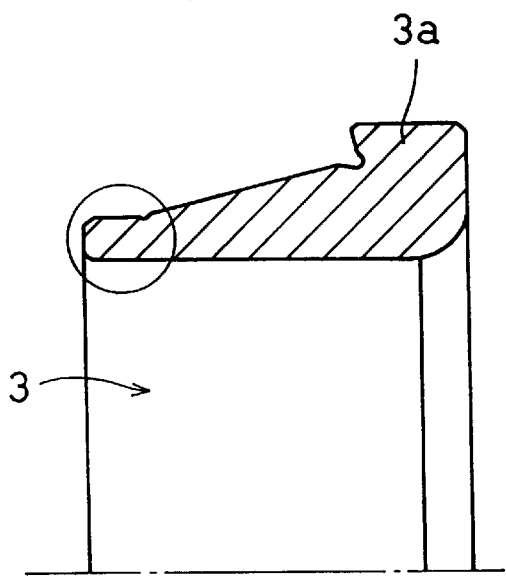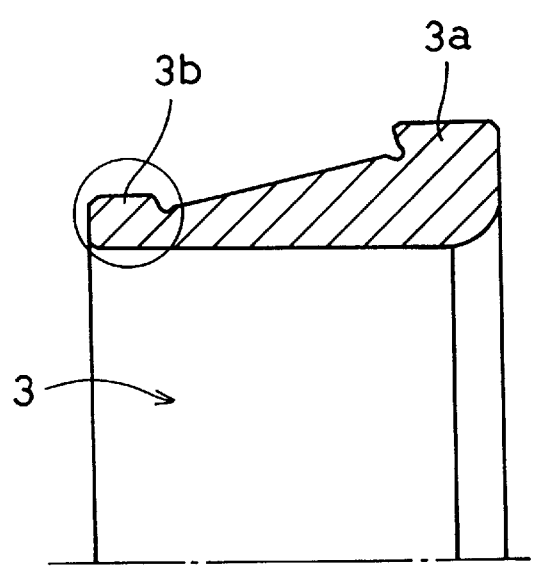

HUB UNIT BEARING ASSEMBLY AND A METHOD OF MAKING THE SAME

BACKGROUND OF THE INVENTION

1. Field of the Invention

The present invention relates to a hub unit bearing assembly of a kind for use in a wheel bearing having a relatively high load capacity such as, for example, a wheel bearing in a truck or a wagon, and also to a method of making such hub unit bearing assembly.

2. Description of the Prior Art

A vehicle wheel bearing assembly utilizing an angular ball bearing has evolved from the first generation in which a sealed dual bearing is solely utilized, to the second generation in which a hub unit bearing having an outer race concurrently serving as a flanged hub is utilized and then to the third generation in which outer and inner races include respective flanges. The fourth generation is now under development in which an equal-speed joint is integrated with the bearing.

In contrast thereto, the wheel bearing utilizing a tapered roller bearing is generally utilized in a truck and little demand has been made to downscale the wheel bearing and are therefore left behind the times. Under these circumstances, the wheel bearing utilizing the tapered roller bearing has merely evolved to a second-generation hub unit bearing assembly in which the outer race concurrently serves as a flanged hub.

With recent increase in demand for wagons of a type generally known as a one-box car, versatility is desired for and, therefore, integration and downscaling have come to be a prime need. Even a wheel bearing of a high load capacity utilizing a tapered roller bearing is not an exception.

In view of this, attempts have been made to develop the hub unit bearing assembly which may be qualified as a third generation for the wheel bearing of a type utilizing the tapered roller bearing, but because the difference between the tapered roller bearing and the ball bearing leads to a difference in assemblage and, therefore, the third-generation hub unit bearing assembly has not yet been realized.

By way of example, although in the second-generation hub unit bearing assembly in which the tapered roller bearing is utilized, the inner race, the cage or the roller retainer and the rollers can be fitted to the outer race as a prefabricated assembly, the third-generation hub unit bearing assembly requires the hub and the inner race to be mounted on the hub to be assembled at a later stage of assemblage. For this reason, unless the cage is of a shape capable of retaining the rollers as carried thereby, automated assemblage of the hub unit bearing assembly poses a problem.

SUMMARY OF THE INVENTION

Accordingly, the present invention has been devised with a view to substantially eliminating the above discussed problems inherent in the prior art and is intended to provide an improved hub unit bearing assembly which is compact in structure and has component parts integrated together and which can be assembled by an automatic assembling machine.

Another important object of the present invention is to provide an improved hub unit bearing assembly of the type discussed above which is lightweight, utilizes a minimized amount of material, is easy to machine and has a relatively large freedom of design choice.

It is a related object of the present invention to provide a method of making the hub unit bearing assembly of the type discussed above.

In order to accomplish these objects, the present invention according to one aspect thereof provides a hub unit bearing assembly comprising a tapered roller bearing including an inner race, an outer race having a fixture defined therein so as to extend radially outwardly therefrom, and a multiplicity of rollers retained in a circumferential row by a cage and rollingly positioned between the inner race and the outer race. A hub includes the inner race on a portion of an outer periphery of the hub, which inner race may be a member integral with the hub or a member separated from the hub. The cage has pockets defined therein for rotatably accommodating therein the respective rollers in such a way that the cage can retain the rollers in a non-detachable fashion prior to being incorporated in the bearing assembly. The cage and the rollers are, after the rollers have been mounted in the associated pockets, inserted in between the inner race and the outer race.

According to this aspect of the present invention, since the cage carries the rollers in the form as retained thereby, assemblage of the unit hub bearing assembly by the use of an automatic assembling machine can easily be accomplished. Also, since the hub having the inner race and the outer race having the fixture are utilized, it is possible to provide the compact hub unit bearing assembly in which some component parts are integrated together.

The present invention according to another aspect thereof provides a hub unit bearing assembly which comprises a hub having one end portion formed with an inner race mount for mounting a first inner race with a first inner raceway defined therein and also having an inner raceway defined at a portion of the hub on one side of the inner race mount opposite to such one end portion of the hub, and a dual tapered roller bearing including a first inner race fixedly mounted on the inner race mount in the hub, a common outer race having a fixture defined therein so as to extend radially outwardly, first and second cages each having a plurality of pockets defined therein, and first and second circumferential rows of rollers retained within the pockets in the first and second cages, respectively. The first circumferential row of the rollers is rollingly positioned between the common outer race and the first inner raceway and the second circumferential row of the rollers is rollingly positioned between the common outer race and the second inner raceway. The inner race has a reduced-diameter end and a large-diameter end opposite to the reduced-diameter end, and the reduced-diameter end of the inner race is, when the inner race is mounted on the inner race mount in the hub, positioned immediately next to the second inner raceway. Only the large-diameter end of the inner race is formed with a collar for axially positioning the rollers. In other words, the use of a small end collar is eliminated.

Since even in this hub unit bearing assembly the hub and the outer race having the fixture are utilized, it is possible to provide the compact hub unit bearing assembly in which the component parts are integrated together. Also, since the first inner race is employed in the form of a member separate from the hub, such effects can be obtained that assemblage of the bearing component parts can easily be accomplished; that seals can easily be installed; that a freedom of bearing design choice can be increased; and that different cages can be employed for the first and second circumferential rows of the rollers. In such case, since no small end collar is provided in the inner race, the amount of material used is reduced accompanied by reduction in weight and manufacturing cost. Yet, since no machining of the small end collar is necessary, the number of portions of the hub unit bearing assembly to be machined can advantageously be reduced. Moreover, since no small end collar is necessary, it is possible to design the hub unit bearing assembly in which, for example, the axial length thereof is reduced, thus providing a further increased freedom of design choice.

The present invention according to a third aspect thereof provides a hub unit bearing assembly utilizing a combination of the structure according to the first aspect in which each of the first and second cages is so designed as to retain the respective row of the rollers prior to being incorporated in the bearing assembly with the structure according to the second aspect in which the inner race separate from the hub is mounted on the hub and the use of the small end collar is eliminated from the inner race.

According to the third aspect of the present invention, since each of the first and second cages carries the rollers in the form as retained thereby, assemblage by the use of an automatic assembling machine is possible and it is therefore easy to assemble the hub and the inner race together. In such case, since it is possible to employ a procedure of mounting of the inner race on the hub after each of the first and second cages carrying the respective rows of the rollers in the form as retained thereby has been inserted in between the common outer race and the hub, the inner race itself need not carry the associated row of the rollers and no small end collar is necessitated. The elimination of use of the small end collar thus obtained is effective to reduce the weight of the resultant hub unit bearing assembly.

In the hub unit bearing assembly of the structure according to any one of the aspects of the present invention, the cage may have a rib positioned between the neighboring pockets. This rib is of a design having radially inner and outer ends opposite to each other. Respective spaces between the radially inner end of one of the ribs and the radially inner end of the next adjacent rib and between the radially outer end of one of the ribs and the radially outer end of the next adjacent rib are of a size sufficient to prevent the corresponding roller, received in the associated pocket, from dropping out of such associated pocket. The radially inner end of each of the ribs is resiliently yieldable to allow the corresponding roller to be snapped into the associated pocket. This design is particularly advantageous in that the possibility of the rollers being separated radially inwardly or outwardly from the corresponding cage prior to being incorporated in the bearing assembly can be eliminated.

Also, each of the cages may have a corresponding number of ribs each left by forming the neighboring pockets and delimited between opposite ring bodies of different diameters that occupy associated axially opposite ends of the respective cage. In this case, each of the ribs between the neighboring pockets is so shaped and so positioned as to protrude inwardly from an imaginary conical surface connecting radially inner ends of the respective opposite ring bodies. In other words, each of the ribs between the neighboring pockets may have a large thickness in a direction radially inwardly. This design makes it easy for each rib to have a cross-sectional shape so that not only can the possibility of the rollers being separated radially inwardly or outwardly from the corresponding cage prior to being incorporated in the bearing assembly be eliminated, but also the radially inner end of each of the ribs is resiliently yieldable to allow the corresponding roller to be snapped into the associated pocket.

A method of making the hub unit bearing assembly of the type discussed hereinabove in accordance with the third aspect of the present invention comprises the steps of preparing first and second roller-cage assembling components each including the respective cage carrying the rollers within the associated pockets in a non-detachable fashion; inserting the first and second roller-cage assembling components into the common outer race so as to occupy respective positions occupying first and second outer raceways defined inside the common outer race; inserting the hub into an assembly of the first and second roller-cage assembling components with the common outer race until the radially inner raceway and the inner race mount in the hub are aligned with the first and second roller-cage assembling components, respectively; and mounting the inner race onto the inner race mount.

According to the method discussed above, by employing the procedure in which after the cages carrying the respective circumferential rows of the rollers in the form as retained thereby have been incorporated in between the hub and the outer race, the inner race which is a member separate from the hub is mounted on the hub, the inner race itself need not retain the rollers and no small collar is needed. The elimination of use of the small collar brings about such an effect that the weight of the hub unit bearing assembly as a whole can be reduced advantageously.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views.

FIGS. 2A to 2E illustrate the sequence of assemblage of the hub unit bearing assembly shown in FIG. 1;

FIG. 3A is a fragmentary longitudinal sectional view, on an enlarged scale, of one of cages used in the hub unit bearing assembly shown in FIG. 1;

FIG. 3B is a fragmentary side view, on a further enlarged scale, showing a portion of the cage of FIG. 3A as viewed in a direction along the arrow X in FIG. 3A;

FIG. 6A is a longitudinal sectional view, on an enlarged scale, showing an upper half of an inner ace employed in the hub unit bearing assembly;

FIG. 6B is a longitudinal sectional view, showing a similar portion of an inner race shown for comparison purpose;

DETAILED DESCRIPTION OF THE EMBODIMENTS

Figure 1:
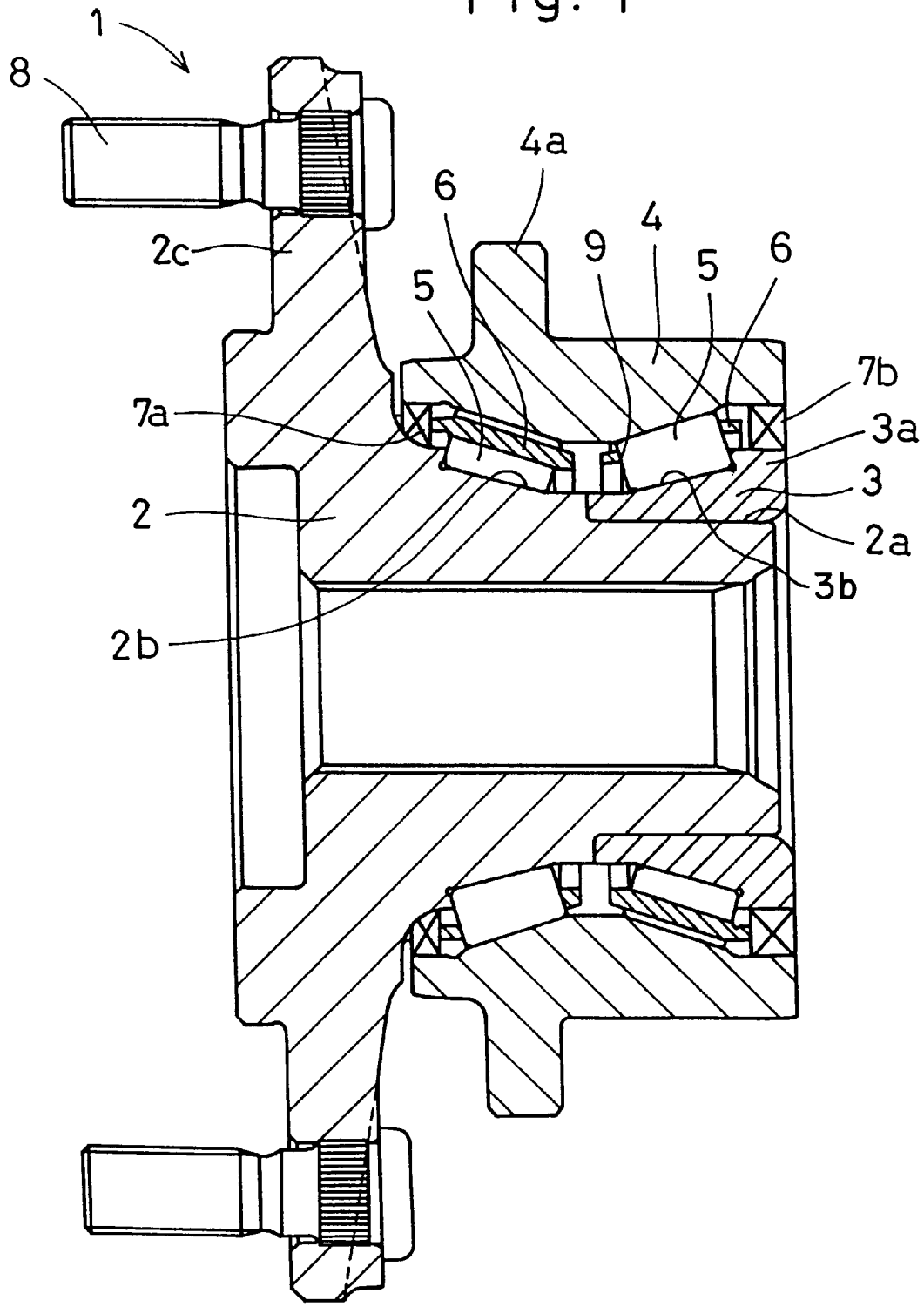
FIG. 1 is a longitudinal sectional view of a hub unit bearing assembly according to a first preferred embodiment of the present invention.

Referring first to FIGS. 1 to 6A showing a first preferred embodiment of the present invention, a hub unit bearing assembly shown therein by 1 makes use of a dual tapered roller bearing assembly for bearing an automobile wheel axle through a hub unit. This hub unit bearing assembly 1 includes, as shown in FIG. 1, first and second circumferential rows of rollers 5 retained respectively by first and second cages 6, a common outer race 4, and an inner race 3 mounted under interference fit around a tubular hub 2 and having an axial length generally half the axial length of the common outer race 4. Each of the rollers 5 of the first and second circumferential rows is in the form of a tapered roller having a large-diameter end and a reduced-diameter end opposite to the reduced-diameter end. The first circumferential row of the tapered rollers 5 are, while retained by the first cage 6, positioned between the common outer race 4 and the inner race 3 whereas the second circumferential row of the tapered rollers 5 are, while retained by the second cage 6, positioned between the common outer race 4 and an outer peripheral wall portion of the tubular hub 2 as will be described in detail later. It is to be noted that in the dual tapered roller bearing assembly shown therein, the first and second circumferential rows of the tapered rollers 5 are so positioned as to permit the respective reduced-diameter ends of the tapered rollers 5 of the first and second circumferential rows to confront with each other.

The illustrated dual-tapered roller bearing assembly also includes ring-shaped seals 7a and 7b positioned inside and adjacent respective opposite ends of the common outer race 4 to prevent a lubricant oil from leaking out of a bearing gap delimited between the common outer race 4 and the tubular hub 2 and the inner race 3.

The tubular hub 2 has one end portion reduced in outer diameter to define an inner race mount 2a and the opposite end portion formed with a radially outwardly extending flange 2c which is adapted to be secured to a vehicle wheel (not shown) by means of a plurality of bolts 8 extending across the thickness of the radial flange 2c. A generally intermediate portion of the tubular hub 2 has its outer peripheral surface serving as a second radially inner raceway 2b for the support of the second circumferential row of the tapered rollers 5 and, for this purpose, the second radially inner raceway 2b is smoothly continued to a first inner raceway 3b defined by an inner peripheral surface of the inner race 3. Thus, it will readily be understood that, while the inner race 3 which is a member separate from the tubular hub 2 is used to support the first circumferential row of the tapered roller 5, that intermediate portion of the tubular hub 2 concurrently serves as another inner race for supporting the second circumferential row of the tapered rollers 5.

The common outer race 4 is of a design having the inner peripheral surface formed with first and second radially outer raceways associated respectively with the first and second circumferential rows of the tapered rollers 5 and also having an outer peripheral surface formed with a radially outwardly extending flange 4a which serves as a fixture through which the hub unit bearing assembly 1 can be secured to a vehicle chassis (not shown) by means of a plurality of fastening means such as, for example, bolts.

As best shown in FIG. 6A, the inner race 3 separate from the tubular hub 2 has inner and outer ends opposite to each other, the inner end having an outer diameter smaller than that of the outer end. This inner race 3 is mounted on the tubular hub 2 with the inner end oriented towards the radial flange 2c and positioned in the neighborhood of the second radially inner raceway 2b. While the inner end of the inner race 3 is formed with no collar, the outer end thereof is formed with a collar 3a that extends radially outwardly therefrom to axially position the first circumferential row of the tapered rollers 5.

Each of the cages 6 for the respective first and second circumferential rows of the tapered rollers 5 is of a design comprising, as best shown in FIGS. 3A and 3B, a ring-shaped band of a substantially truncated conical shape preferably made of a synthetic resin and having a plurality of axially oriented, generally rectangular pockets 9 defined therein in a direction circumferentially thereof for accommodating therein the respective tapered rollers 5. Each cage 6 has a corresponding number of ribs 10 each left by forming the neighboring pockets 9 and delimited between opposite ring bodies 11 and 12 that occupy associated opposite ends of the ring-shaped band forming the respective cage 6. Each rib 10 between the neighboring pockets 9 is so shaped and so positioned as to protrude radially inwardly from an imaginary conical surface F connecting radially inner ends of the ring bodies 11 and 12.

Figure 4A:
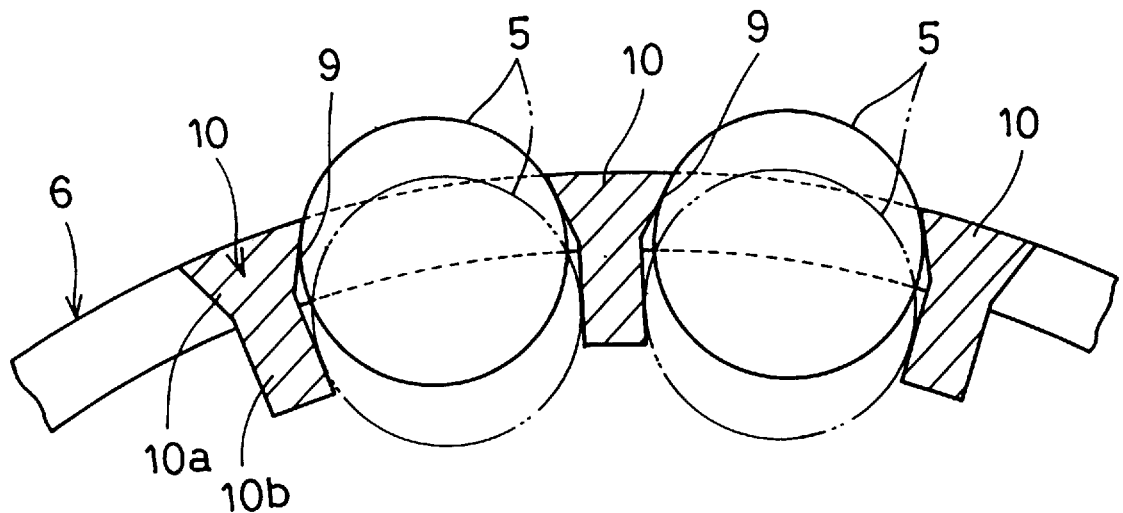
FIG. 4A is a fragmentary cross-sectional view taken along the line A—A in FIG. 3A, showing a portion of the cage on an enlarged scale.
Figure 4B:
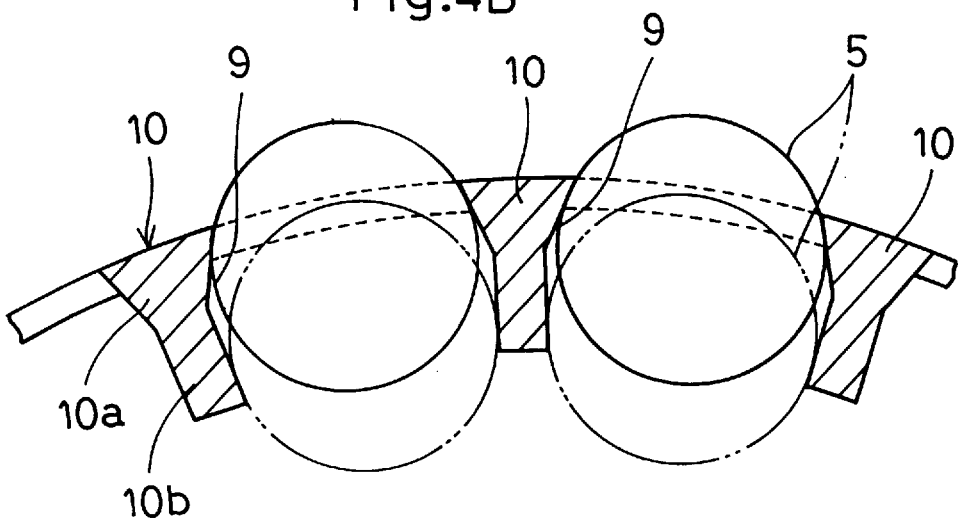
FIG. 4B is a fragmentary cross-sectional view taken along the line B—B in FIG. 3A, showing a portion of the cage on an enlarged scale.
Figure 4C:
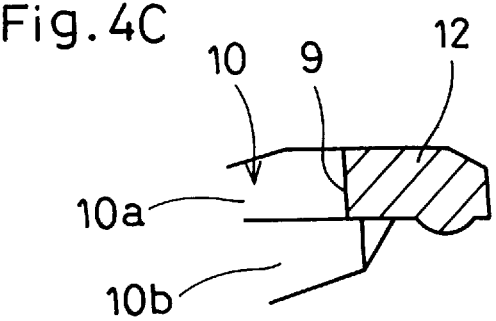
FIG. 4C is a fragmentary sectional view of a portion of the cage which is encompassed within the circle C in FIG. 3A.

More specifically, as shown in FIGS. 4A and 4B which illustrate respective cross-sections of reduced-diameter and large-diameter end portions of the rib 10, each cage 6 has a radially outer portion 10a of a shape similar to an inverted trapezoidal shape and a radially inner portion 10b protruding from the radially outer portion 10a in a direction radially inwardly of the respective cage 6. The cross-sectional shape of the radially outer portion 10a of each cage 6 is such as to be progressively narrowed in a direction radially inwardly of the cage 6 whereas the radially inner portion 10b thereof has a uniform width and is positioned radially inwardly of the imaginary conical surface F as shown in FIG. 3A. It is to be noted that the cross-sectional representation of the large-diameter end portion of each cage 6 that is encompassed by the phantom circle C in FIG. 3A is shown in detail in FIG. 4C.

The circumferential width of each of the pockets 9 as measured generally between the radially outer portions 10a and 10a of the neighboring ribs 10 on respective sides of such pocket 9 in a direction circumferentially of the respective cage 6 is so chosen that as shown by the solid line in FIGS. 4A and 4B the corresponding tapered roller 5 accommodated in such pocket 9 can rollingly contact mutually confronting tapering side faces of the neighboring ribs 10 without being separated therefrom in a direction radially outwardly.

On the other hand, the circumferential spacing between the radially inner portions 10b and 10b of such neighboring ribs 10 is so chosen as to be slightly smaller than the diameter of a portion of the associated tapered roller 5 that is accommodated within such pocket 9. However, the radially inner portions 10b and 10b of the neighboring ribs 10 can be resiliently yielded to increase the circumferential spacing therebetween to allow the corresponding tapered roller 5 to be snugly fitted inside the respective pocket 6 when such tapered roller 5 is, during the mounting of the tapered rollers 5 in the respective pockets 9, forcibly pushed from inside of the cage 6. The radially inner portions 10b and 10b will restore to the respective original positions by the effect of their own resiliency to allow the tapered roller 5 to lightly contact mutually confronting side faces of those radially inner portions 10b and 10b of the neighboring ribs 10, as shown by the phantom line in FIGS. 4A and 4B, after completion of mounting of the tapered rollers 5 in the respective pockets 9, thereby preventing the tapered rollers 5 from detaching of the pockets 9.

In an assembled condition of the hub unit bearing assembly 1 of the present invention, each of the tapered rollers 5 is retained in position within the associated pocket 9 and guided while contacting the respective radially outer portions 10a of the neighboring ribs 10 as shown by the solid line. in FIGS. 4A and 4B and without contacting the radially inner portions 10b of such neighboring ribs 10. Thus, by designing each rib 10 to have a thickness increased in a radial direction, it is easy to design the cross-sectional shape of each rib 10 which is effective to avoid any possible separation of one or some of the respective tapered rollers 5 when, before assemblage of the hub unit bearing assembly 1 completes, the tapered roller 5 is likely to drop out of the associated pocket 9 in a direction radially inwardly of each of the cages 6.

Figure 5A:
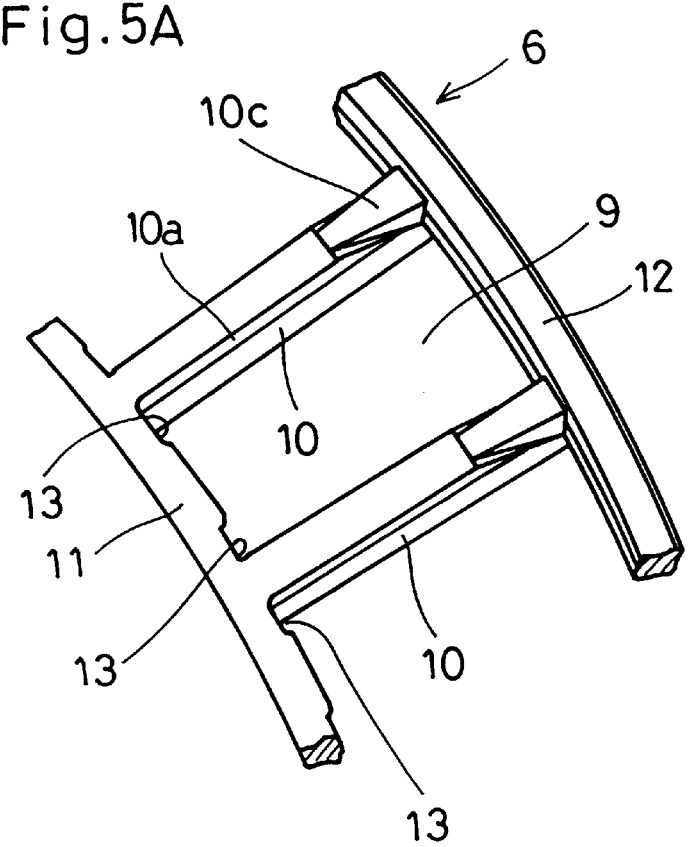
FIG. 5A is a fragmentary perspective view of a portion of the cage as viewed from inside in a direction radially inwardly of the cage.
Figure 5B:
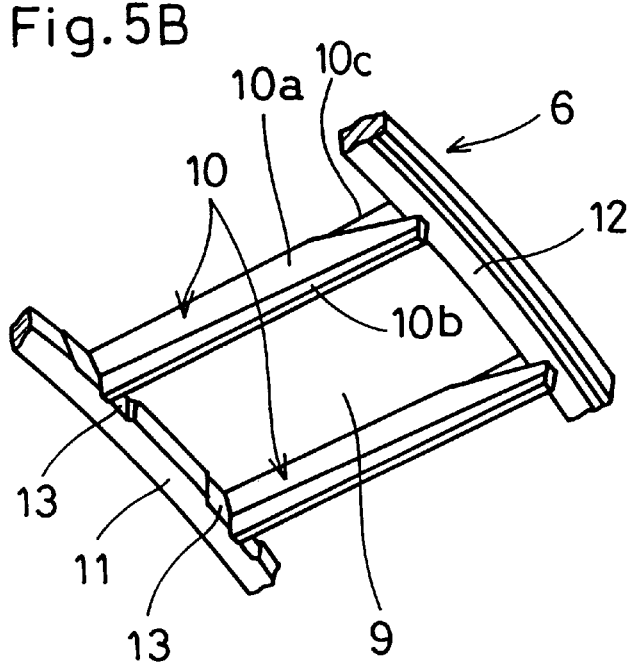
FIG. 5B is a fragmentary perspective view of that portion of the cage as viewed from outside in a direction radially outwardly of the cage.

As best shown in FIG. 3B, the ring body 11 of each of the first and second cages 6 which has a diameter smaller than that of the ring body 12 thereof has cutouts 13 each defined at an area adjacent to a corner area, delimited by the rib 10 and the ring body 11, in communication with the associated pocket 9. Also, as best shown in FIG. 5A, a region of each of the ribs 10 in each of the first and second cages 6 adjacent the larger-diameter ring body 12 is provided with a generally trapezoidal segment 10c continued from the respective radially outer portion 10a thereof and progressively narrowed in a direction towards the reduced-diameter ring body 11 as viewed from a radial direction, which trapezoidal segment 10c is provided for the convenience of a molding work employed during formation of the respective cage 6.

FIGS. 2A to 2E illustrate the sequence of assemblage of the hub unit bearing assembly 1 of the present invention. At the outset, the common outer race 4 as shown in FIG. 2A is assembled with first and second roller-cage assembling components 15 as shown in FIG. 2B, followed by insertion of the first seal 7a into the common outer race 4 as shown in FIG. 2C. The assembly including the common outer race 4 and the first and second roller-cage assembling components 15 inside the common outer race 4 is subsequently mounted on the tubular hub 2 as shown in FIG. 2D, until the inner raceway 2b and the inner race mount 2a in the hub 2 are aligned with the assembling components 15, followed by mounting of the inner race 3 on the tubular hub 2 as shown in FIG. 2E and also mounting the second seal 7b between the inner race 3 and the outer race 4 to thereby complete the assemblage of the hub unit bearing assembly 1.

As described hereinbefore, since the hub unit bearing assembly 1 is manufactured by incorporating the first and second roller-cage assembling components 15 in which the first and second circumferential rows of the tapered rollers 5 have been retained by the respective cages 6 in a non-detachable fashion, assemblage of the hub unit bearing assembly 1 of the present invention can easily be accomplished by an automatic machine and installation of the inner race 3 on the tubular hub 2 can be facilitated. In such case, since a process step of mounting of the inner race 3 is employed after the first and second roller-cage assembling components 15 have been fitted in between the common outer race 4 and the tubular hub 2, the first circumferential row of the tapered rollers 5 need not be retained by the inner race 3 itself through the associated cage 6 and the necessity of use of a small end collar in the inner race 3 is eliminated.

For this reason, the inner race 3 is of a shape from which the small end collar is eliminated and, because of this, as compared with the inner race having the small end collar 3b therewith as shown in FIG. 6B, the material can be advantageously reduced, accompanied by reduction in not only weight, but also cost. Also, since no machining of the small end collar is needed in the present invention, a portion which requires machining or grinding can be reduced. Moreover, since no small end collar is needed, it is possible to set up a design in which the axial length of the bearing assembly 1 is reduced, resulting in a large freedom of design choice.

Also, since the hub unit bearing assembly 1 of the structure shown in FIG. 1 makes use of the tubular hub 2 with the radial flange 2c and the outer race 4 with the radial flange or fixture 4a, the present invention is effective to provide the hub unit bearing assembly 1 of a compact structure in which integration of some of the component parts has been accomplished. In such case, since the inner race 3 is chosen to be a member separate from the tubular hub 2, it is possible to adapt the structure, in which integration of some of the component parts is highly progressed, to the tapered roller bearing. Also, since the separate first and second cages 6 can be employed in association with the first and second circumferential rows of the tapered rollers 5, the strength of each of the first and second cages 6 can be increased.

Figure 7:
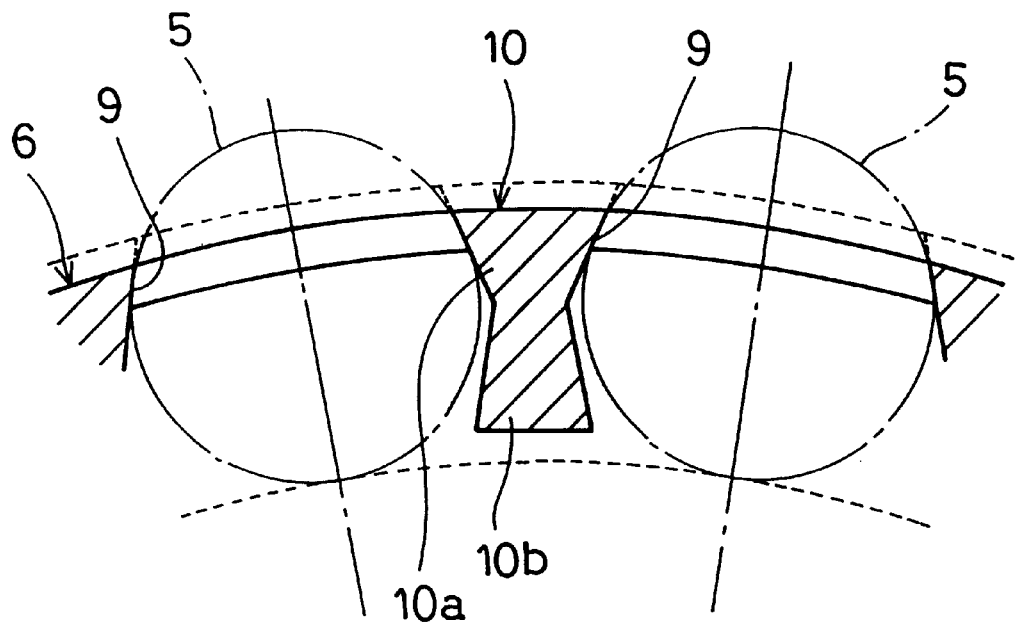
FIG. 7 is a view similar to FIG. 4A, showing a modified form of the cage.
Figure 8:
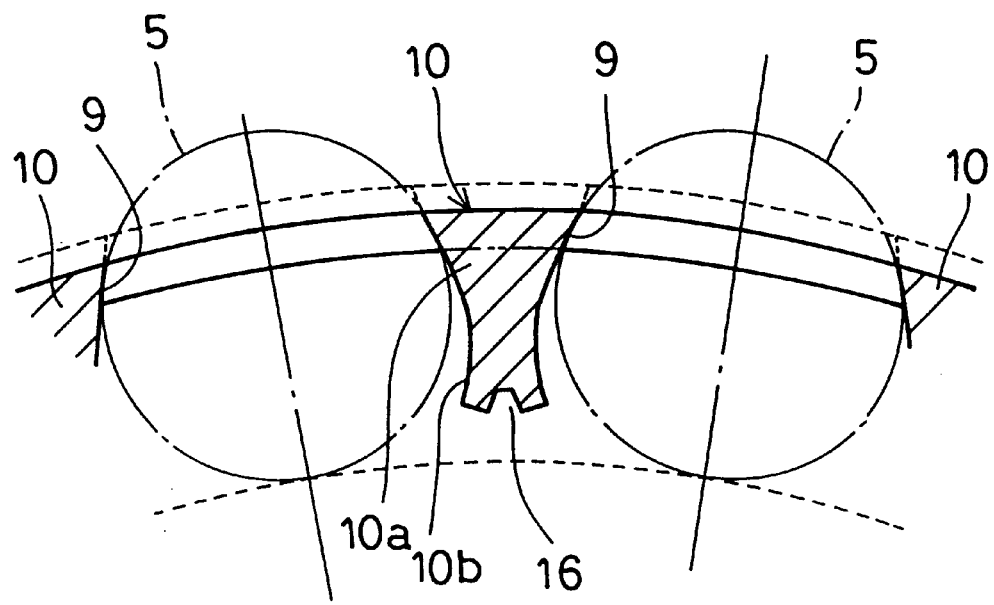
FIG. 8 is a view similar to FIG. 4A, showing a further modified form of the cage.

It is to be noted that the radially inner portion 10b of each of the ribs 10 in any one of the first and second cages 6 may have a generally trapezoidal cross-sectional shape widening radially inwardly at a predetermined angle, for example, about 20° as shown in FIG. 7. Alternatively, as shown in FIG. 8, each of the ribs 10 in any one of the first and second cages 6 may be of a generally Y-shaped configuration with its opposite side faces curved inwardly. In any event, although a radially inwardly confronting face of each of the ribs 10 is shown in FIG. 8 to have a recess 16 defined therein for facilitating a molding work used to form the respective cage 6 and/or for the purpose of reducing the weight thereof, the use of such recess 16 in each rib 10 is not always necessary and may therefore be omitted.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A hub unit bearing assembly which comprises:
   a hub having one end portion formed with an inner race mount for mounting a first inner race with a first inner raceway defined therein, said hub including,
      a second inner raceway defined at a portion of the hub on one side of the inner race mount opposite to such one end portion of the hub, and
      a flange which is securable to a vehicle wheel; and
   a dual tapered roller bearing including,
      the first inner race, the first inner race being fixedly mounted on the inner race mount in the hub,
      a common outer race having a fire defined therein so as to extend radially outwardly,
      first and second cages made from synthetic resin, each cage having a plurality of pockets defined therein, first and second circumferential rows of rollers retained within the pockets in the first and second cages, respectively, and a first and a second ring-shaped seal, wherein the first circumferential row of rollers are rollingly positioned between the common outer race and the first inner raceway, the second circumferential row of rollers are rollingly positioned between the common outer race and the second inner raceway, the first and second seals are positioned inside of and adjacent to respective opposite ends of the common outer race with the first seal being mounted between the common outer race and the first inner race and the second seal being mounted between the common outer race and the hub, said inner race has a reduced-diameter end and a large-diameter end opposite to said reduced-diameter end, said reduced-diameter end of said inner race being, when the inner race is mounted on the inner race mount in the hub, positioned immediately next to the second inner raceway, at least said large-diameter end of said inner race being formed with a collar for axially positioning the rollers, at least the second cage is capable of retaining said second circumferential row of rollers in a non-detachable fashion prior to being incorporated in the bearing assembly, said first and second rows of rollers being, after having been mounted in the associated pockets in the first and second cages, inserted in between the first inner raceway and the common outer race and between the second inner raceway and the common outer race, respectively, and said second seal is adjacent to the flange of the hub and is assembled with the common outer race prior to assemblage of the hub with the common outer race.

2. The hub unit bearing assembly as claimed in claim 1, wherein each of the first and second cage has a rib positioned between the neighbor pockets, said rib having radially inner and outer ends opposite to each other, respective spaces between the radially inner end of one of the ribs and the radially inner end of the next adjacent rib and between the radially outer end of one of the ribs and the radially outer end of the next adjacent rib being of a size sufficient to prevent the corresponding roller, received in the associated pocket; from dropping out of such associated pocket, and wherein said radially inner end of each of the ribs is resiliently yieldable to allow the corresponding roller to be snapped into the associated pocket.

3. The hub unit bearing assembly as claimed in claim 1, wherein each of the first and second cages has a corresponding number of ribs each left by forming the neighboring pockets and delimited between opposite ring bodies of different diameters that occupy associated axially opposite ends of the respective cage, and wherein each of said ribs between the neighboring pockets is so shaped and so positioned as to protrude radially inwardly from an imaginary conical surface connecting radially inner ends of the respective opposite ring bodies.

4. A hub unit bearing assembly as claimed in claim 1, wherein an interface of the reduced-diameter portion of the inner race and the hub forms a substantially cylindrical surface continuous with the exterior of the hub.

5. A hub unit bearing assembly as claimed in claim 1, wherein said first cage and said first row of rollers are restrained from movement towards the reduced-diameter end of the first inner race solely by contact with the first inner race and the outer race.

6. A hub unit bearing assembly as claimed in claim 1, wherein the first inner race includes an inner contact surface which includes a roller contacting surface and a substantially cylindrical surface adjacent to the roller contacting surface, the roller contacting surface and the substantially cylindrical surface forming an obtuse angle.

7. A method of manufacturing a hub unit bearing assembly, said hub unit bearing assembly comprising a hub having one end portion formed with an inner race mount and also having an inner raceway defined at a portion of the hub on one side of the inner race mount opposite to such one end portion of the hub, and having a flange securable to a vehicle wheel; a dual tapered roller bearing including a common outer race having a fixture defined therein so as to extend radially outwardly, first and second cages made from a synthetic resin, each cage having a plurality of pockets defined therein, first and second circumferential rows of rollers retained within the pockets in the first and second cages, respectively, and a first and a second ring-shaped seal, said method comprising the steps of:

providing a first inner race having a reduced-diameter end, a large-diameter end opposite to said reduced-diameter end, at least said large-diameter end of said inner race being formed with a collar, the surface of the first inner race forming a first inner raceway;

preparing first and second roller-cage assembling components each including the respective cage carrying the rollers within the associated pockets, at least the second cage being capable of retaining the rollers in a non-detachable fashion;

inserting the first and second roller-cage assembling components and the second seal into the common outer race so that the components occupy respective positions occupying first and second outer raceways defined inside the common outer race;

inserting the hub into an assembly of the first and second roller-cage assembling components with the common outer race until the radially inner raceway and the inner race mount in the hub are aligned with the first and second roller cage assembling components, respectively;

mounting the first inner race onto the inner race mount; and mounting the first seal between the first inner race and the common outer race.

8. A method of manufacturing a hub unit bearing assembly as claimed in claim 7, wherein the step of providing the first inner race includes the step of providing the reduced-diameter end such that the reduced-diameter end and the hub form a substantially cylindrical surface which is continuous with the exterior of the hub.

9. A method of manufacturing a hub unit bearing assembly as claimed in claim 7, wherein the step of providing the inner race includes the step of providing a roller contacting surface and a substantially cylindrical surface adjacent to the roller contacting surface, the roller contacting surface and the substantially cylindrical surface forming an obtuse angle.

* * * * *